(12) United States Patent
Yasuzato

(10) Patent No.: US 7,844,850 B2
(45) Date of Patent: Nov. 30, 2010

(54) BROADCAST/VOD RECEIVER AND VIEWING MANAGEMENT METHOD

(75) Inventor: Masashi Yasuzato, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/471,149

(22) Filed: May 22, 2009

(65) Prior Publication Data

US 2009/0292939 A1 Nov. 26, 2009

(30) Foreign Application Priority Data

May 23, 2008 (JP) ............................. 2008-135921

(51) Int. Cl.
- G06F 1/14 (2006.01)
- G06F 9/44 (2006.01)
- G06F 9/455 (2006.01)

(52) U.S. Cl. ...................... 713/502; 717/168; 717/169; 717/174; 717/176

(58) Field of Classification Search ................. 713/502; 717/168, 169, 174, 176
See application file for complete search history.

(56) References Cited

U.S. PATENT DOCUMENTS

| | | | |
|---|---|---|---|
| 6,463,584 B1 * | 10/2002 | Gard et al. ................... | 717/171 |
| 7,610,405 B1 * | 10/2009 | Moberg et al. .............. | 709/242 |
| 2002/0073410 A1 * | 6/2002 | Lundback et al. ........... | 717/171 |
| 2004/0145766 A1 * | 7/2004 | Sugishita et al. ............ | 358/1.13 |
| 2005/0091354 A1 * | 4/2005 | Lowell et al. ............... | 709/223 |
| 2007/0162565 A1 * | 7/2007 | Hanselmann ................ | 709/219 |
| 2007/0188507 A1 * | 8/2007 | Mannen et al. ............. | 345/532 |
| 2009/0172655 A1 * | 7/2009 | Ivanov ........................ | 717/173 |

FOREIGN PATENT DOCUMENTS

| | | |
|---|---|---|
| JP | 04-218793 | 8/1992 |
| JP | 05-073296 | 3/1993 |
| JP | H07-066785 A | 3/1995 |
| JP | 2002-278409 | 9/2002 |

OTHER PUBLICATIONS

Explanation of Non-English Language Reference(s).
Notice of Reasons for Rejection for the Japanese patent application No. 2008-135921 mailed by Japan Patent Office on Jul. 28, 2009.

* cited by examiner

Primary Examiner—Vincent T Tran
(74) Attorney, Agent, or Firm—Knobbe, Martens, Olson & Bear LLP

(57) ABSTRACT

According to one embodiment, an information processor comprises a flush memory which stores a main program for executing information processing by using time data acquired through the clock count operation and a sub-program for upgrading a version of the main program of the information processing, a storage memory which stores the time data, and an arithmetic processing unit which executes the main program in starting the processor and executes the sub-program in upgrading the version, wherein the arithmetic processing unit executes the sub-program so as to continue the clock count operation even during execution of the version upgrading, and when the upgrading has completed, restarts the main program so as to restart the clock count operation by using the time data stored in the storage upon an execution start caused by restarting the main program.

9 Claims, 4 Drawing Sheets

BROADCAST/VOD RECEIVER AND VIEWING MANAGEMENT METHOD

CROSS-REFERENCE TO RELATED APPLICATIONS

This application is based upon and claims the benefit of priority from Japanese Patent Application No. 2008-135921, filed May 23, 2008, the entire contents of which are incorporated herein by reference.

BACKGROUND

1. Field

One embodiment of the present invention relates to an information processor and a method for upgrading a version of the processor. The information processor and the method relate to a device which executes information processing by using time data that depends on a clock count operation, and a method for upgrading the version of the device.

2. Description of the Related Art

In general, an information processor includes a function for executing information processing by using time data that depends on a time count operation. Meanwhile, the information processor upgrades a version of a processing program stored inside the processor in order to resolve a failure and add a function. However, in upgrading the version, since the processor stops execution of the program currently being processed, and stops the time counting operation, and then initializes the time data upon restarting, the processor generally prompts a user to reset the time data upon restarting.

For instance, although a video recorder with a reserved recording function of using the time data mounted thereon implements the clock count operation by means of a microcomputer, when the software in the microcomputer is upgraded, the video recorder generally resets the microcomputer, and then, restarts itself from an initial state. However, in resetting the microcomputer, since data in a random access memory (RAM), which is the storage destination of clock data, is lost, the video recorder has to start the operation after initializing the data in the RAM upon restarting. Therefore, obviously, since the time data stored in the RAM is initialized, it is needed to correct the clock time.

As is explained above, for the conventional video recorder, it is necessary for the user to correct the clock time, or for the clock to be corrected on the basis of time information from a vertical blanking interval (VBI), a time offset table (TOT) to be transmitted in a digital broadcast, or a network time protocol (NTP) server of the Internet.

However, in reality, there is a possibility for a user to forget to correct the clock time. However, time correction through a VBI, TOT or NTP may not actually correct the time, due to certain settings or circumstances of a system. Therefore, in upgrading the version, the video recorder is restricted in certain aspects of operation, such as reserved recording based on clock data, or gives up the upgrading the version to be automatically performed through a broadcasting wave in order to avoid an operation restriction.

To resolve the foregoing burden, a video recorder which can automatically set the time of the clock has been proposed in Jpn. Pat. Appln. KOKAI Publication No. 07-066785. According to this proposal, the video recorder extracts time information included in the received broadcasting signal to set the time of the clock on the basis of the extracted time information. However, the method disclosed therein sets the time at a preset time, or upon power off of a main unit, and the setting is implemented in a manner having no connection with the version upgrading. Since the time of the clock is not set until time information is acquired from outside, the video recorder cannot utilize a timer function before acquiring the time information.

As mentioned above, in the conventional information processor, the time data results in initializing in initialization processing in upgrading the version, and it is needed to set the time of the clock in restarting the video recorder.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processor which executes information processing by using time data to be acquired through execution of a clock count operation, comprising a continuation means for continuing the clock count operation in execution of upgrading a version of an information processing program; a storage means for storing the time data; a restart means for restarting the information processing when the version upgrading has completed; and a restart means for restarting the clock count operation by using the time data stored in the storage means with an execution start caused by restarting the information processing.

Figure 1:
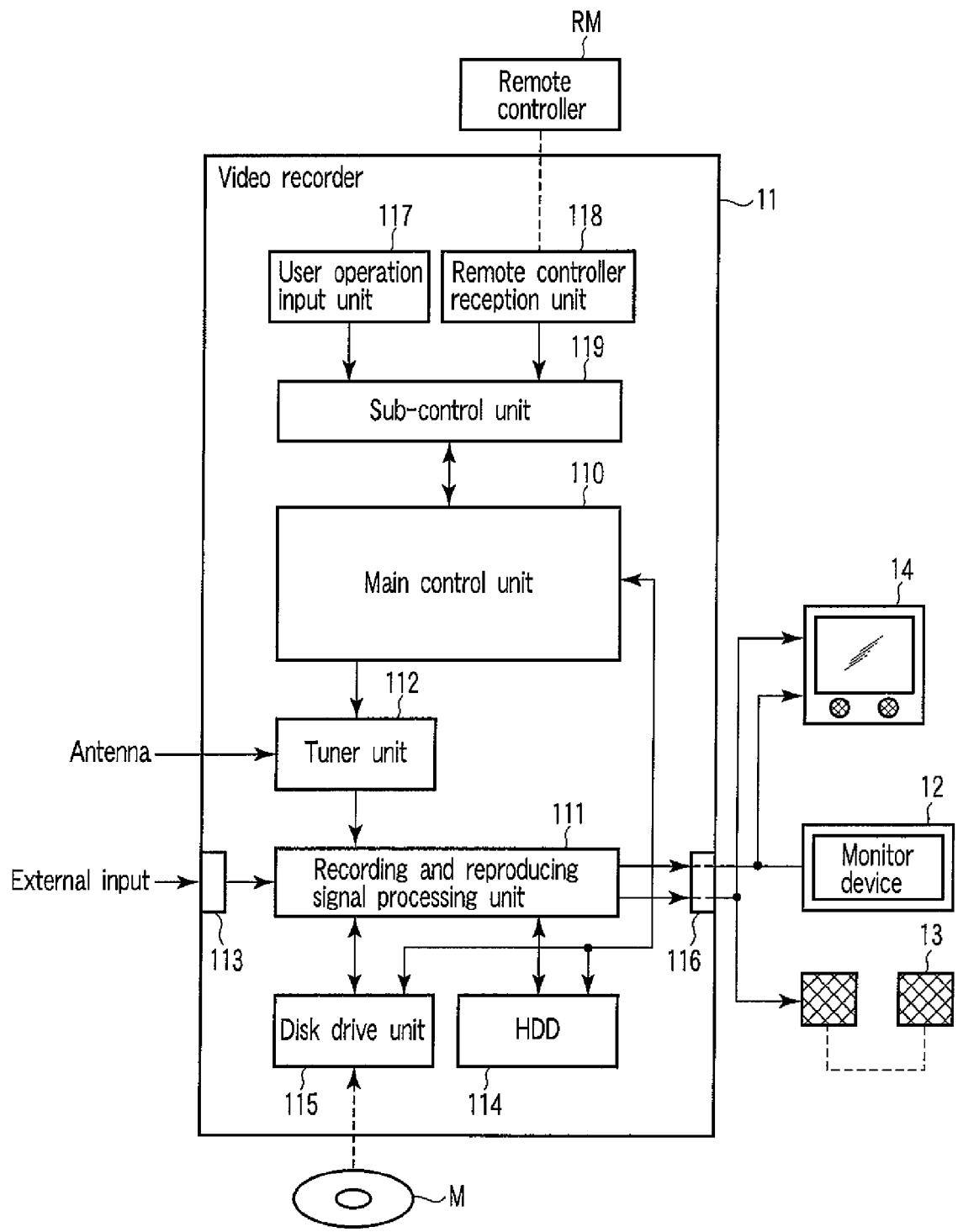
FIG. 1 is a block diagram illustrating a configuration of a video recorder to which the invention is applied, as an embodiment of an information processor with a timer function mounted thereon of the invention.

FIG. 1 shows a block diagram depicting a configuration of a video recorder to which the invention is applied as an embodiment of an information processor with a timer function mounted thereon of the invention. In FIG. 1, a video recorder 11 has a recording/reproducing signal processing unit 111 which records and reproduces a video signal and an audio signal by means of a digital signal processor (DSP).

While the processing unit 111 will not be described in detail, the processing unit 111 includes a video encoder unit, a video decoder unit, and an audio decoder unit, and implements recording and reproducing of an input video signal/audio signal in accordance with control by means of a main control unit 110. For instance, the processing unit 111 has a function of encoding a video signal/audio signal of a digital broadcast program tuned and received by a tuner unit 112, or a video signal/audio signal input from an external input unit 113 to record the signals in an optical disk M through a hard disk drive (HDD) 114 or a disk drive unit 115. The processing unit 111 has a function of decoding to reproduce the video signal and audio signal stored in the HDD 114, or the video signal and audio signal to be read from the optical disk M through the disc drive unit 115. Further, the processing unit 111 has a function of converting the video signal and audio signal which have been reproduced by a monitor device 12, a loudspeaker 13, a television receiver 14, or the like connected to an external output unit 116 into each signal format to output the signals.

An antenna (not shown) to receive, for example, a digital satellite broadcast or a terrestrial digital broadcast is connected to the tuner unit 112. The video signal and audio signal to be input to the external input unit 113 may be distributed via a network (not shown).

The video recorder 11 comprises a user operation input unit 117 which receives a user instruction input by a main unit operation key, a remote controller reception unit 118 which receives the user instruction input from a remote terminal (referred to as a remote controller) RM, and a sub-control unit 119 which takes in the user operation inputs from the user operation input unit 117 and the remote controller reception unit 118 to notify instructions corresponding to the respective operation inputs to the main control unit 110.

Here, although the main control unit 110 will not be described in detail, the main control unit 110 includes at least program table/dubbing reservation simultaneous display control, dubbing reservation acceptable time zone retrieval, dubbing required time calculation, dubbing acceptable title (content) retrieval, dubbing reservation control, and recording reservation control, as program control by a central processing unit (CPU) or a main processing unit (MPU). The main control unit 11 has an on screen display (OSD) function of displaying, for example, input operation information and a selected channel through the user operation input unit 117 and the remote controller reception unit 118, or a selection screen and an operation screen corresponding to an instruction for dubbing on the television receiver 14 and the monitor device 12 to be connected to the external output unit 116.

The user operation input unit 117 receives operation inputs to be directly instructed by an operation button group (not shown) provided for the main unit of the video recorder 11. For instance, the user operation input unit 117 may input a reproduction instruction by means of a reproduction (PLAY) button and a recording instruction by means of a recording (REC) button usually disposed for the main unit of the video recorder 11.

The remote controller reception unit 118 receives control information to be instructed from the user through the remote controller RM, and receives user operation, such as, selection of a broadcast wave/input to be received (acquired) through the tuner unit 112 or external input unit 113, recording processing by means of the recording and reproducing signal processing unit 111 and decision of content (title) to be dubbed (or moved) to the optical disk M.

In the main control unit 110, if an instruction for dubbing, dubbing reservation or recording reservation is issued through the remote controller reception unit 118, the OSD function makes the monitor device 12 or the television receiver 14 connected to the external output unit 116 display a graphical user interface (GUI).

Figure 2:
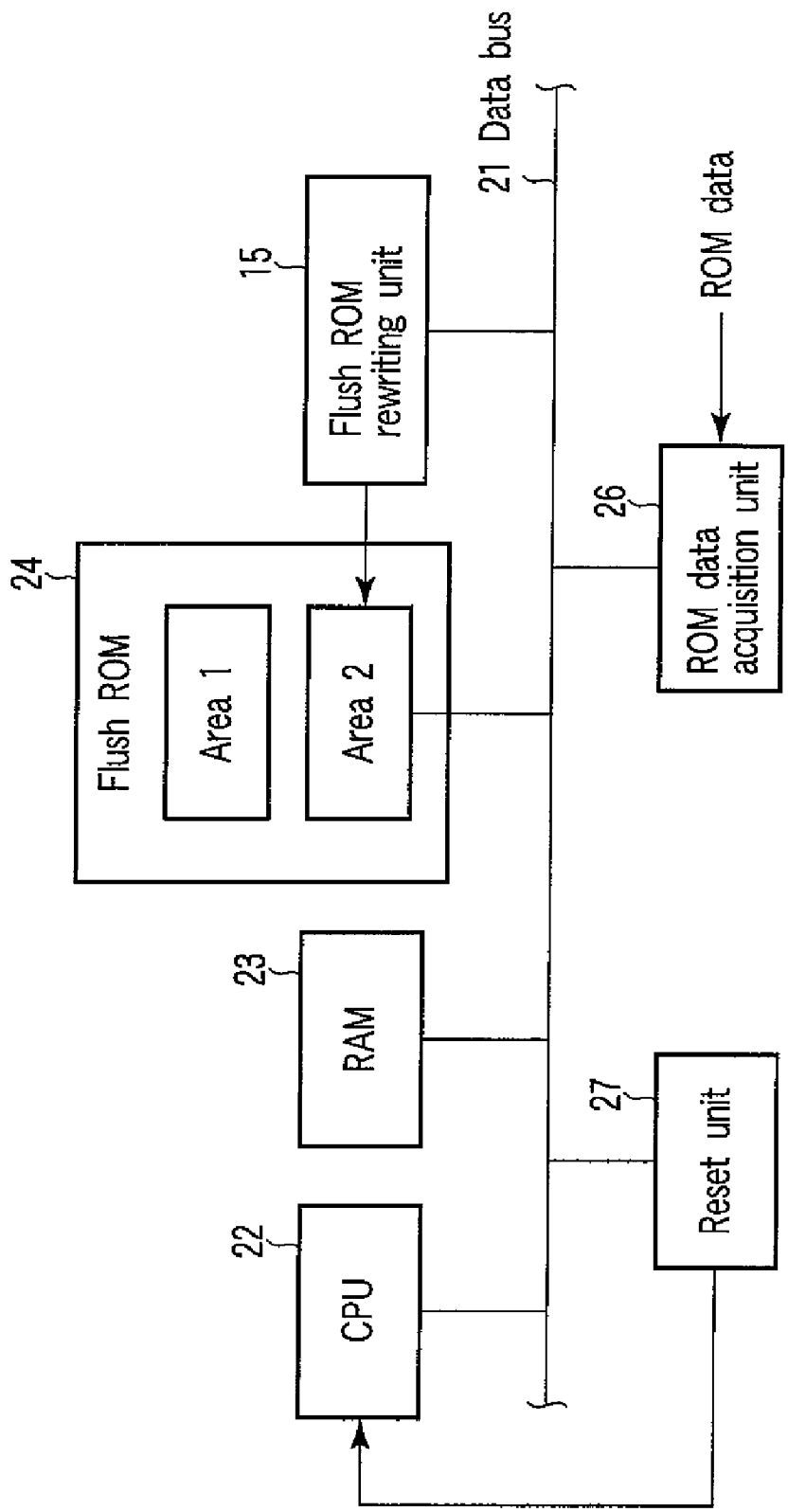
FIG. 2 is a block diagram illustrating a concrete configuration of a sub-control unit of the embodiment shown in FIG. 1.

FIG. 2 shows a block diagram depicting a concrete configuration of the sub-control unit 119. In FIG. 2, the numeric figure 21 designates a data bus, and a CPU 22, a RAM 23 for processing work, a flush ROM 24 having an area 1 and an area 2, a flush ROM rewriting unit 25 which executes rewriting of a main program to be stored in the area 2 of the flush ROM 24, a flush ROM rewriting unit 25 which executes rewriting of the main program to be stored in the area 2 of the flush ROM 24, a ROM data acquisition unit 26 which acquires ROM data for upgrading the version of the program in the flush ROM 24, and a reset unit 27 which resets the CPU 21 are connected to the data bus 21. Usually, the CPU 22 implements the clock count operation by interruption processing of the main program written in the area 2 in the flush ROM 24. The time data based on the clock count operation is stored in the RAM 23.

In the sub-control unit 119 of the aforementioned configuration, a sub-program including a program which executes the operation of upgrading the version and a program which executes the clock count operation is stored in the area 1 of the flush ROM 24.

Figure 3:
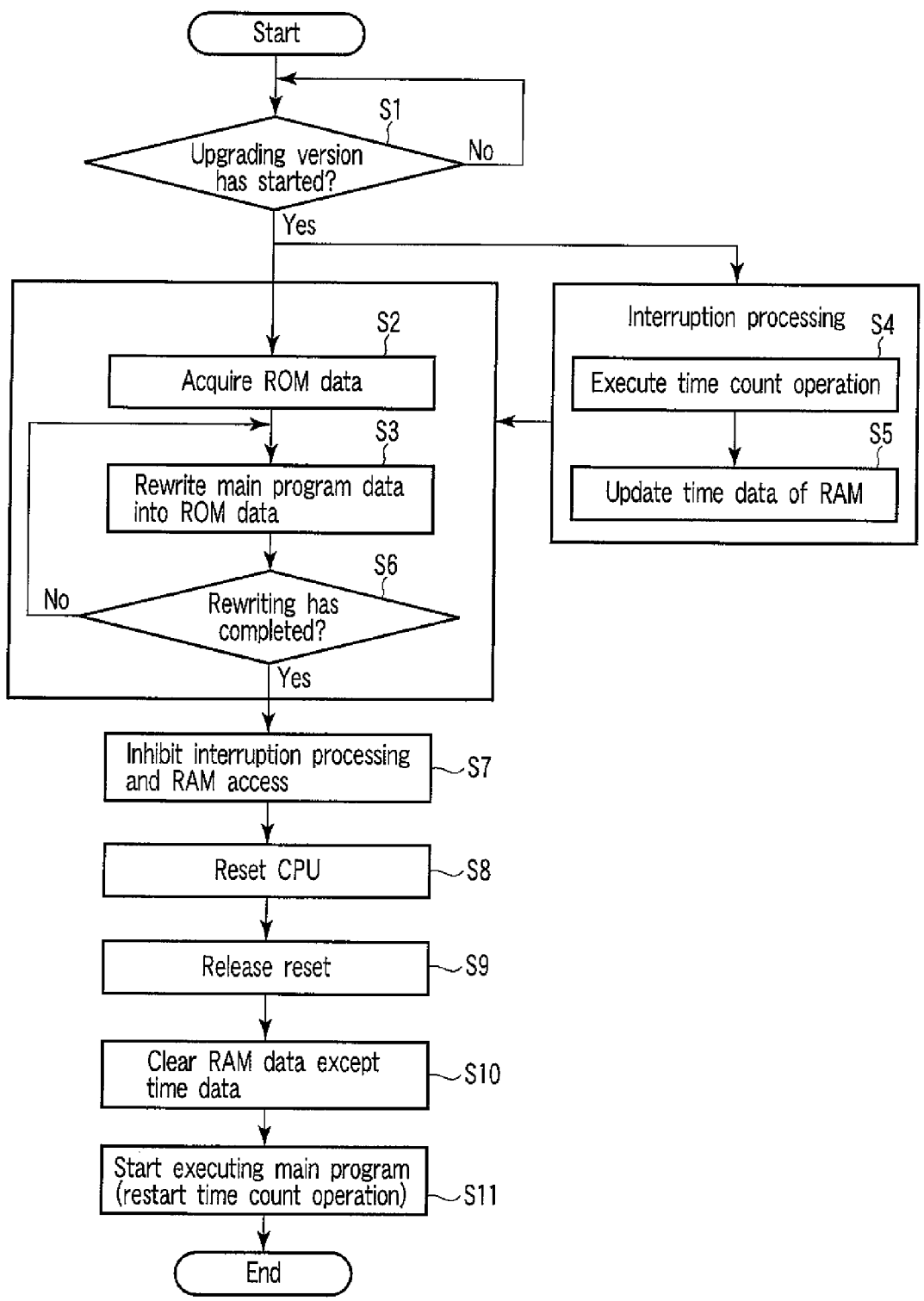
FIG. 3 is a flowchart illustrating a processing procedure of upgrading a version of the sub-control unit of the embodiment shown in FIG. 1.
Figure 4:
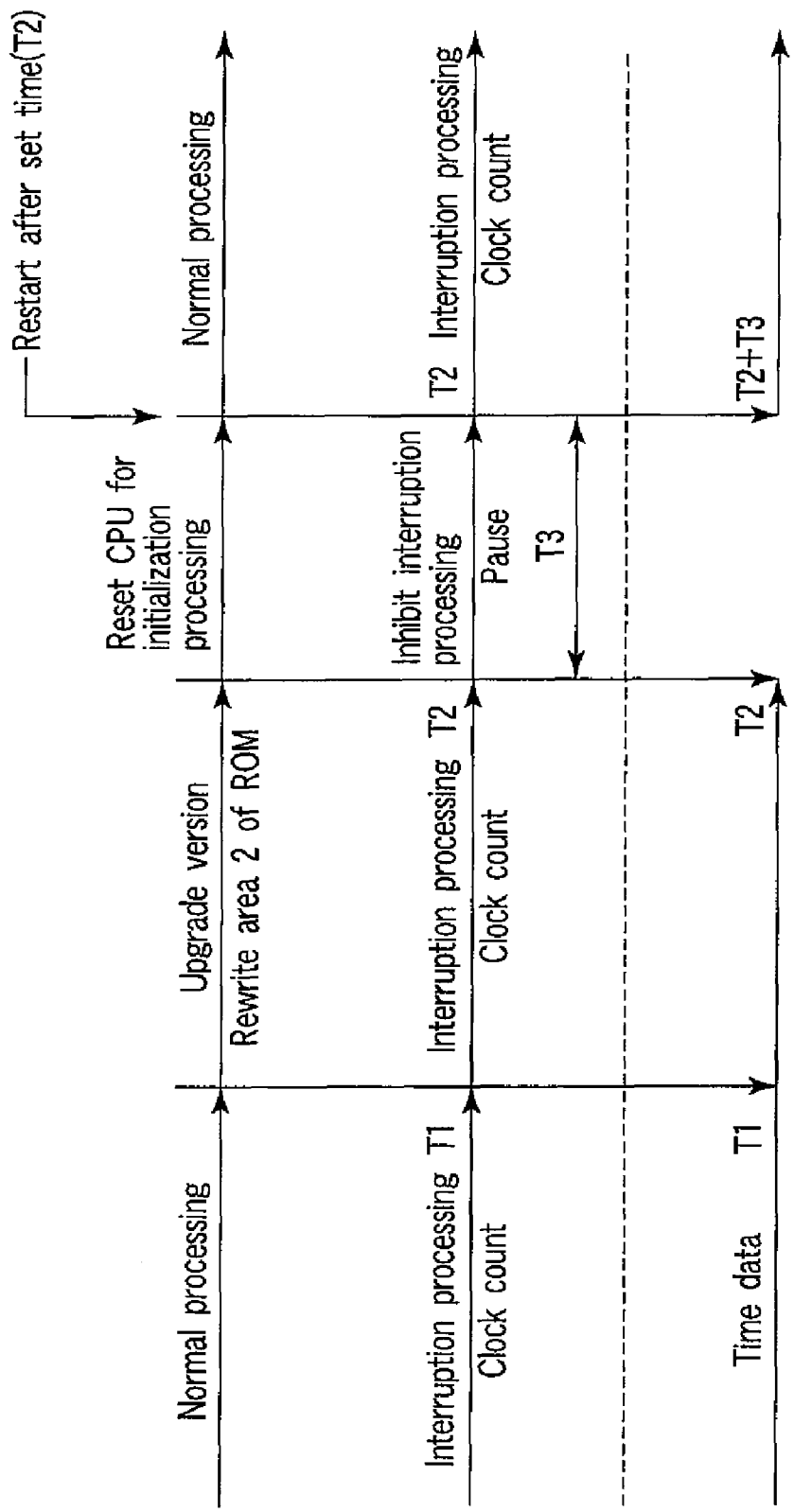
FIG. 4 is a timing chart illustrating each processing process in the processing procedure of the version upgrading shown in FIG. 3.

In the configuration of the above, a processing procedure of upgrading a version by the sub-control unit 119 will be described with reference to the flowchart shown in FIG. 3 and the timing chart shown in FIG. 4.

The CPU 22 executes the main program stored in the area 2 of the flush RON 24 in usual processing, executes the clock count by the interruption processing, and stores the counted time data in the RAM 23. In this state, if the instruction of the start of upgrading the version is issued through the user operation (Step S1), the sub-control unit 119 starts execution of the sub-program for upgrading the version stored in the area 1 of the flush ROM 24, makes the ROM data acquisition unit 26 acquire the ROM data for upgrading the version (Step S2), and rewrites the data of the main program stored in the area 2 of the flush ROM 24 into the ROM data acquired by the ROM data acquisition unit 26 through the ROM data rewriting unit 25 (Step S3). During rewriting the ROM data (T1-T2 of FIG. 4), the CPU 22 continuously executes clock count operations_through the interruption processing of the sub-program (Step S4), and updates the time data to be stored in the RAM 23 (Step 5).

If the rewriting processing of the ROM data by means of the sub-program has completed (Step S6), the CPU 22 sets the interruption processing and the RAM access into an inhibition state (Step S7), and then, the CPU 22 is reset into the initial state by means of the reset unit 27 (Step S8). After releasing the reset (Step S9), the RAM data except for the time data is cleared (Step S10). The CPU 22 executes the processing of the main program from the initial address in the area 2 of the flush ROM 24, and restarts the clock count operation of the clock data stored in the RAM 22 though the interruption processing (Step S11). Thereby, the time data continues before and after the version upgrading, it results in useless of reset.

A time lag occurs until the clock count operation is restarted after the interruption processing is set to the inhibition state. In restarting the clock count operation in Step S11, a period T3 required by the initializing processing is added to the time data (T2) stored in the RAM 23. Thereby, although it is a short while, the period, in which the clock count operation in processing initialization is stopped, is corrected, and the time data can be continued with high precision.

That is, in the foregoing operation of upgrading the version, while the initial setting processing after completing the rewriting implements the data initialization processing of the RAM 23, since the operation of upgrading the version does not initialize the time data and uses the continuous time data, there is no need to reset the time data. Further, when the clock count operation is restarted after completing the initialization, a fixed period which is required for initialization is corrected. Thereby, even if the time is not corrected after upgrading the version, relatively accurate time data may be acquired. As a result, it becomes possible to avoid a failure occurrence such that the operation of the reserved recording, etc., is not executed. Since there is no need to acquire the time data from outside or perform resetting by the user, the information processing device makes it possible to continue a stable time count which is not influenced by its surroundings.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main processor module with a main program which is configured to execute a clock count operation, and to execute information processing using time data derived from a clock count operation;
   a sub processor module configured to execute a sub-program configured to continue the clock count operation instead of the main processor module while upgrading the main program to a new version; and
   a storage module configured to store the time data derived by the clock count operation,
   wherein the sub processor module is configured to restart the main program and to discontinue the time count operation when the upgrading is completed, and
   wherein the main processor module is configured to restart the clock count operation using the time data in the storage module at a timing of restarting the main program.

2. The information processing apparatus of claim 1, wherein
   the sub processor module is further configured to prohibit a writing operation of data in the storage module comprising the time data while restarting the main program.

3. The information processing apparatus of claim 1, wherein
   the main processor module is configured to add a prescribed time to the time data just after suspension of the count operation in order to initialize the time data when the clock count operation is restarted.

4. An information processing apparatus, comprising:
   a flash memory comprising a memory area configured to store a main program for executing a clock count operation in order to execute information processing by using time data from the clock count operation and a memory area configured to store a sub-program for upgrading the main program of the information processing to a new version;
   a storage memory configured to store the time data; and
   an arithmetic processor configured to execute the main program when the processing apparatus is started and to execute the sub-program for upgrading the version, wherein
   the arithmetic processor is configured to continue the clock count operation and to execute the version upgrading by executing the sub-program, configured to restart the main program when the upgrading is completed, and to restart the clock count operation using the time data in the storage memory at a timing of restarting the main program.

5. The information processor of claim 4, wherein
   the arithmetic processor is further configured to prohibit a writing operation of data in the storage memory comprising the time data while restarting.

6. The information processor of claim 4, wherein
   the arithmetic processor is configured to add a prescribed time to the time data in the storage memory in order to initialize the time data when the clock count operation is restarted.

7. An upgrading method of an information apparatus for upgrading a main program of information processing to a new version, the information processing apparatus configured to execute a clock count operation and to execute the information processing using time data from the clock count operation, the method comprising:
   continuing the clock count operation during the version upgrading of the main program by executing a sub-program;
   storing the time data in a memory;
   restarting the information processing by switching from the sub-program to the main program and discontinuing the clock count operation when the version upgrading is completed; and
   restarting the clock count operation using the time data stored in the memory at a timing of restarting the information processing.

8. The method for upgrading the program of the information processing apparatus of claim 7, further comprising:
   prohibiting a writing operation of data in the memory comprising the time data while restarting the main program.

9. The method for upgrading the program of the information processing apparatus of claim 7, further comprising:
   adding a prescribed time to the time data in the memory in order to initialize the time data at the timing of restarting the clock count operation.

* * * * *